UNITED STATES PATENT OFFICE 2,628,977

METHOD OF PREPARING UNSATURATED AMIDES

William E. Grigsby, Wilmington, Del., assignor to E. I. du Pont de Nemours & Company, Wilmington, Del., a corporation of Delaware No Drawing. Application September 17, 1948, Serial No. 49,866

8 Claims. (Cl. 260—561)

This invention relates to a process for the preparation of unsaturated organic amides, and more particularly relates to the recovery of acrylamide and methacrylamide from a solution of reaction products obtained by unsaturating and amidating acetaldehyde cyanhydrin and acetone cyanhydrin, respectively.

It is known that methacrylamide can be produced by treating acetone cyanhydrin with sulfuric acid at temperatures from 90 to 140° C., although isolation of the methacrylamide from the reaction mixture involves slow and uneconomical procedures. Various methods have been proposed for effecting the separation for instance by dissolving the whole reaction mass in water followed by neutralization with an alkaline earth metal hydroxide or carbonate. The mixture is then filtered to remove the insoluble sulfate and the aqueous solution evaporated to obtain a residue consisting mainly of methacrylamide. The crude residue is then recrystallized to give a substantially pure product. In another method the acetone cyanhydrin-sulfuric acid product is heated to a temperature below 90° C., and the saturated sulfuric acid monoester of alpha-hydroxy, alpha-methylpropionamide produced is treated with ammonium sulfate to give an ammonium salt of the mono-sulfuric acid saturated ester, which ester is then heated at sufficient temperature to decompose the ammonium salt and simultaneously form methacrylamide and ammonium bisulfate.

An object of the present invention is to provide a new and improved method for recovering acrylamide and methacrylamide from reaction mixtures obtained from acetaldehyde cyanhydrin and acetone cyanhydrin sulfuric acid reaction products. Another object is to provide a process for neutralizing the mono-sulfuric acid salt of alpha-methacrylamide with ammonia in an organic solvent. A further object is to provide a recovery process in which the acrylamide and methacrylamide can be separated from involved reaction products by solution in a hot hydrocarbon solvent. Other objects and advantages of the invention will hereinafter appear.

According to the present invention, unsaturated amides, and especially acrylamide and methacrylamide, are produced by heating a mixture of an aldehyde cyanhydrin or ketone cyanhydrin with concentrated sulfuric acid or an alkyl surfuric acid or mixtures thereof to a sufficient temperature to form the unsaturated amide sulfate. This product is then neutralized with anhydrous ammonia or other suitable base in a hot hydrocarbon solvent to produce the unsaturated amide. The ammonium sulfate precipitate is filtered off and the unsaturated amide recovered from the hydrocarbon solvent by cooling the hydrocarbon solution of the amide to a temperature at which the amide is thrown out of solution.

The reactions proceed in accord with these general equations in which R may be hydrogen or an alkyl group:

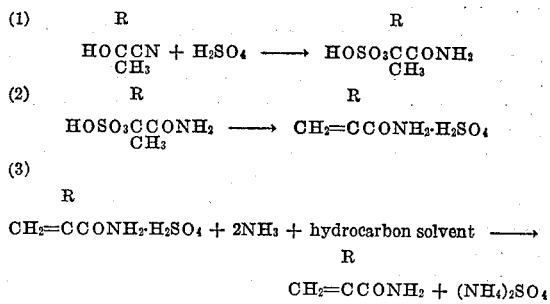

For the preparation of methacrylamide the reactions occur in accord with these equations:

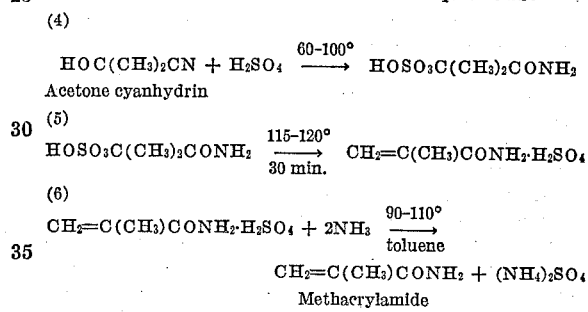

The basic process for preparing the unsaturated acids and corresponding amides is disclosed in U. S. patents of Hill and Crawford et al., U. S. 2,026,894, 2,101,821, 2,101,822 and 2,140,469. The acrylamide is prepared by treating acetaldehyde cyanhydrin with concentrated sulfuric acid under similar conditions to form the mono-sulfuric acid ester of acrylamide.

The neutralization step is conducted with substantially anhydrous ammonia, the ammonia, preferably as a gas, being introduced into the unsaturated amide sulfate until no more ammonia is absorbed. This step is conducted in the hydrocarbon solvent in which ammonium sulfate is insoluble and when the neutralization has been completed the ammonium sulfate may be removed from the neutralized reaction mixture by filtration or centrifugal separation.

The hydrocarbons used for providing the medium in which the neutralization step is conducted include liquid hydrocarbon solvents which are inert to the reactants under the conditions of the reaction. These hydrocarbon solvents should be solvents for acrylamide and methacrylamide under reaction temperature, i. e. at temperatures above 60° C. and should not appreciably dissolve these amides at temperatures below 30° C. Moreover, these solvents should not dissolve significant amounts of ammonium sulfate. As examples of these hydrocarbon solvents are included benzene, toluene, xylene, xylols, the more volatile petroleum solvents such as solvent naphtha, gasolene, etc., and the alkyl benzenes generally.

The solvents also have a much greater solubility for the unsaturated amides when hot than they do when cold. One feature of the invention wherein this differential solubility effect is utilized involves first separating the precipitated ammonium sulfate after neutralizing the sulfuric acid with anhydrous ammonia, and then cooling the salt-free organic solvent-unsaturated amide solution in order to precipitate the unsaturated amide from solution. This is done by cooling the solution to 30° C. or below. After the separation by differential cooling any residual amide can be extracted from the solvent by washing with water.

The examples, in which parts are by weight unless otherwise designated, further illustrate preferred embodiments of the invention.

*Example 1.*—Redistilled acetone cyanhydrin (34 g. 0.2 M) was added to a mixture of 0.4 g. cupric sulfate and 54.9 g. 99.75% sulfuric acid at 30–101° during twenty-two minutes, and the resulting mixture was heated for thirty minutes at 115–120°. The product was dropped into a stirred flask containing 200 cc. of toluene at 90° during twelve minutes, in the presence of a continuous stream of ammonia. The mixture maintained itself at a temperature of 90° for most of the next hour. When the exothermic reaction was over the mixture was filtered through a steam-jacketed Büchner funnel to remove the ammonium sulfate. The solid was extracted with two more 200 cc. portions of boiling toluene, with stirring. The filtrate was cooled and the crystals filtered off and dried. After a small amount of additional methacrylamide had been recovered from the filtrate the yield from acetone cyanhydrin to methacrylamide was 68%.

*Example 2.*—The process of Example 1 was repeated using 11.6 pounds of toluene per pound of methacrylamide and three washings, using about 3.8 pounds of toluene per washing, all other conditions remaining the same. By this process a 67% yield of crude methacrylamide was obtained.

*Example 3.*—By decreasing the amount of toluene to 9.9 pounds per pound of methacrylamide and employing only two washes, using about 4.9 pounds of toluene per washing, a yield of crude methacrylamide of 52% was realized.

*Example 4.*—Distilled acetone cyanhydrin (34 g.) was added to a stirred mixture of 99.75% H₂SO₄ (57.8 g.) and CuSO₄ (0.4 g.) during nineteen minutes; when one-third of the cyanhydrin had been added, the temperature was 90° C.; the maximum temperature was 98° C. The resultant mixture was stirred at 111–115° C. for thirty minutes and then dropped while still warm into a stirred flask containing 250 cc. xylene, into which a stream of ammonia was passed. The addition of the acidic mixture at 35–70° required nineteen minutes; heat continued to be evolved for another thirty minutes, a temperature of 100° being reached without external heat. The product was heated to 135° and filtered through a steam-jacketed Büchner funnel. The solid was extracted twice more with 160–200 cc. portions of xylene, with stirring at reflux temperature. The combined filtrates were cooled to 8° and filtered, giving 25.1 g. crude crystalline methacrylamide.

*Example 5.*—Acetone cyanhydrin (68 g.) was added to 99.75% H₂SO₄ (109.8 g.) during one hour at 32–100° C. The product was stirred at 112–120° C. for thirty minutes. The resultant mixture was dropped during sixteen minutes into 150 g. of toluene, stirred at 109–81° C. in a flask into which a stream of ammonia was passed. The mixture maintained itself at 81–109° C. for two hours without external heat; then it was heated to boiling and filtered through a steam-jacketed Büchner funnel. The solid was heated and stirred with an additional 250 cc. of toluene and filtered again, then heated and stirred with 174 cc. toluene and filtered hot. The combined filtrates were cooled and filtered, yielding 42.7 g. of crude methacrylamide.

I claim:

1. In a method of preparing unsaturated amides having the structural formula

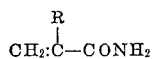

in which R is of the group consisting of hydrogen and methyl groups by treating a cyanhydrin of the group consisting of acetaldehyde cyanhydrin and acetone cyanhydrin with sulfuric acid at a temperature between 90 and 140° C. to form the sulfuric acid salt of the corresponding unsaturated acid amide the step which comprises, neutralizing the resulting mixture with anhydrous ammonia in a hydrocarbon liquid that is a solvent for the unsaturated amide at reaction temperatures but is a substantially lesser solvent therefor at temperatures below reaction temperature, separating the ammonium sulfate formed by filtration and recovering the unsaturated amide from the solvent by cooling.

2. In a method of preparing methacrylamide by treating acetone cyanhydrin with an excess of concentrated sulfuric acid at a temperature between 90 and 140° C. to form a sulfuric acid salt of methacrylamide the step which comprises, neutralizing the salt with anhydrous ammonia in a hydrocarbon liquid that is a solvent for methacrylamide at reaction temperatures but a substantial non-solvent therefor at temperatures below 30° C., separating the ammonium sulfate formed by filtration and recovering the methacrylamide from the solvent.

3. The process of claim 2 in which the solvent is toluene.

4. The process of claim 2 in which the solvent is xylene.

5. In a method of preparing methacrylamide by treating acetone cyanhydrin with an excess of concentrated sulfuric acid at a temperature between 90 and 140° C. to form a sulfuric salt of methacrylamide the step which comprises, neutralizing the salt with anhydrous ammonia in a liquid hydrocarbon that is a solvent for the methacrylamide at reaction temperatures but substantially a non-solvent for methacrylamide at temperatures below 30° C., separating the ammonium sulfate formed by filtration and recovering the methacrylamide from the solvent at temperatures below 30° C.

6. In a method of preparing acrylamide by treating acetaldehyde cyanhydrin with an excess of concentrated sulfuric acid at a temperature between 90 and 140° C. to form a mono-sulfuric acid salt of acrylamide the step which comprises, neutralizing the salt with anhydrous ammonia in a hydrocarbon liquid that is a solvent for acrylamide at reaction temperatures but a substantial non-solvent therefor at temperatures below 30° C., separating ammonium sulfate by filtration and recovering the acrylamide from the solvent.

7. In a method of preparing methacrylamide by treating acetone cyanhydrin with concentrated sulfuric acid at a temperature between 90 and 140° C., the step which comprises gradually passing the resulting solution into stirred toluene into which a continuous stream of anhydrous ammonia is introduced until no more ammonia is absorbed, thereafter filtering the ammonium sulfate at substantially reaction temperature and finally separating the methacrylamide by cooling to a temperature below 30° C.

8. The process for recovering monomeric acrylamide from a sulfuric acid-hydrolysis mixture containing predominately acrylamide sulfate, which comprises neutralizing said mixture with anhydrous ammonia in the presence of an organic solvent for acrylamide, which is a non-solvent for ammonium sulfate, separating the thus precipitated ammonium sulfate by filtration and recovering monomeric acrylamide from the filtrate.

WILLIAM E. GRIGSBY.

REFERENCES CITED

The following references are of record in the file of this patent:

UNITED STATES PATENTS

| Number | Name | Date |
|---|---|---|
| 2,101,822 | Crawford et al. | Dec. 7, 1937 |
| 2,140,469 | Crawford et al. | Dec. 13, 1938 |
| 2,431,468 | Davis et al. | Nov. 25, 1947 |

FOREIGN PATENTS

| Number | Country | Date |
|---|---|---|
| 255,886 | Great Britain | Feb. 17, 1927 |